United States Patent
Ulbricht et al.

(10) Patent No.: US 6,670,427 B1
(45) Date of Patent: Dec. 30, 2003

(54) TEMPLATE-TEXTURED MATERIALS, METHODS FOR THE PRODUCTION AND USE THEREOF

(75) Inventors: Mathias Ulbricht, Berlin (DE); Sergiy Piletski, Kiev (UA); Uwe Schedler, Berlin (DE); Heike Matuschewski, Berlin (DE)

(73) Assignee: Poly-Am GmbH (DE)

( * ) Notice: Subject to any disclaimer, the term of this patent is extended or adjusted under 35 U.S.C. 154(b) by 0 days.

(21) Appl. No.: 09/762,357

(22) PCT Filed: Aug. 2, 1999

(86) PCT No.: PCT/DE99/02429

§ 371 (c)(1),
(2), (4) Date: Mar. 26, 2001

(87) PCT Pub. No.: WO00/07702

PCT Pub. Date: Feb. 17, 2000

(30) Foreign Application Priority Data

| Aug. 3, 1998 | (DE) | 198 36 180 |
| Nov. 24, 1998 | (DE) | 198 55 290 |
| Aug. 2, 1999 | (DE) | 199 36 992 |

(51) Int. Cl.$^7$ .................. C08G 63/48; C08F 20/10; C08F 2/46
(52) U.S. Cl. .................. 525/330.3; 525/54.11; 525/263; 525/273; 522/1
(58) Field of Search .................. 525/330.3, 54.11, 525/263, 273; 522/1

(56) References Cited

U.S. PATENT DOCUMENTS 5,786,428 A    7/1998   Arnold et al.

FOREIGN PATENT DOCUMENTS

| EP | 0764680 | 3/1997 |
| WO | 9305068 | 3/1993 |
| WO | 9416319 | 7/1994 |
| WO | 9641235 | 12/1996 |
| WO | 9722410 | 6/1997 |

*Primary Examiner*—James J. Seidleck
*Assistant Examiner*—Olga Asinovsky
(74) *Attorney, Agent, or Firm*—Kriegsman & Kriegsman

(57) ABSTRACT

Template-textured materials in the form of template-textured polymers (TGP) on various surfaces including membranes (i.e, template-textured membranes). Such materials are created by modifying the surface of solid carriers, which, by cross-linking polymerization of functional monomers initiated on the surface of said solid carriers in the presence of a template, leads to stable template prints that subsequently bind template molecules or template derivatives in a specific manner. The invention also relates to methods for the production of TGPs and to the use thereof for substance-specific separation of materials.

21 Claims, 10 Drawing Sheets

Modification of Membranes

TEMPLATE-TEXTURED MATERIALS, METHODS FOR THE PRODUCTION AND USE THEREOF

BACKGROUND OF THE INVENTION

The invention relates to novel template-textured materials in the form of template-textured polymers (TTPs, (TGP)) from aqueous solutions, as well as TTPs on a solid carrier (e.g. membranes), methods for the production and use thereof for substance-specific separation of materials.

In biotechnology, for products such as enzymes, monoclonal antibodies or recombinant proteins, new and efficient separation and cleaning strategies are required. This is equally valid for synthetic drugs, in particular when these exhibit a more complex structure and/or a higher molecular weight or a restricted stability.

For all of these fields of application, substance-specific high-performance materials are searched for, a high flexibility in adapting to the specific targets being required. Solid materials (particles, films) are preferably used so as to facilitate phase separation of solid and fluid substance flows. Contrary to separation methods based on different physical properties, the chemical affinity to the carrier is the prerequisite for substance-specific separations. Substance-specificity may be obtained by biological or biomimetical receptors. For affinity separations, either specific but very sensitive biological ligands (e.g. antibodies, enzymes), or relatively unspecific synthetic ligands (e.g. dyes, metal chelates) are being used so far; examples being chromatography, solid phase extraction, membrane separation, solid phase assays or sensors (D. Sii, A. Sadana, J. Biotechnol. 19 (1991) 83).

Nonporous films, respectively layers or particles comprising affine ligands on their surfaces possess a restricted binding capacity with porous materials having a higher specific surface and binding capacity, restrictions of the binding capacity typically occur due to diffusion limitations. Directionally permeable porous membranes are therefore particularly attractive alternative materials. Established membrane methods using membranes such as microfiltration or ultra-filtration (MF or UF) work according to the size-exclusion principle (W. Ho, K. Sirkar (Eds.), *Membrane Handbook*, van Nostrand Reinhold, New York, 1992). The separation of substances having a similar molecular size with porous membranes, additionally requires specific (affinity) interactions with the membrane (E. Klein, Affinity Membranes, John Wiley & Sons, New York, 1991).

The main motivation for applying affinity membranes consist in the possibility of a directional flow towards separation-specific groups (ligands/receptors), which are present in the pores in a high density. This allows for a radical improvement of efficiency (decrease in pressure, shorter turnover times, higher throughput rates, scarcely diffusion limitations in pores, faster equilibration) as compared to analogous processes using particles (D. K. Roper, E. N. Lightfoot, j. *Chromatogr.* A 702 (1995)3). Such affinity membranes can be used for separations of materials, preferably of proteins, but also of many other substances (e.g. peptides, nucleic acid derivates, carbohydrate or various toxins, herbicides, pesticides) and even up to cells (U.S. Pat. No. 5,766,908). Furthermore, there exist multiple application possibilities in analytics, such as, for example, for the highly selective enriching of samples or even for the decontamination of material flows (DE 19609479).

A very attractive alternative for biological or biomimetic affinity ligands/receptors, e.g. for chromatography or analytics has been developed in the past years. This is the use of specific, yet highly robust functional cavities ("molecular imprints") in synthetic polymers produced by molecularly texturing polymerization (G. Wulff, *Angew. Chem.* 107 (1995) 1958; K. Mosbach, O. Ramström, *Bio/Technology* 14 (1996) 163; A. G. Mayes, K. Mosbach, *Trends Anal. Chem.* 16 (1997) 321). For this purpose, a polymerization of monomers is realized in the presence of template molecules (e.g. protein, nucleic acid, low-molecular organic substance), which are able to form a relatively stable complex with a functional monomer during polymerization. After the extraction of the template, the so produced materials are able to specifically bind template molecules again. The so synthezised polymers are called template-textured polymers (TTPs, (TGP))/molecularly textured polymers (WIPs, (MIP)) or "fingerprint" polymers (cf. FIG. 1, FIG. 2).

In this manner, for example, the production of polymeric sorbents in the presence of smaller organic molecules (U.S. Pat. No. 5,110,833), respectively of macromolecular substances (U.S. Pat. No. 5,372,719), or the synthesis of acrylamide gels or agarose gels in the presence of proteins have been described (U.S. Pat. Nos. 5,728,296, 5,756,717). Even peptide sorbents, respectively protein-specific sorbents produced by "surface-texturing" of metal chelate structures on specifically functionalized particles have been described (U.S. Pat. No. 5786428). In all cases, high affinities were obtained for the respective templates. The application of artificial antibodies and receptors produced by molecular texturing, has enormous advantages, since these structures are much more stable than their natural equivalents. Moreover, they can be synthesized for each substance (even for those having less distinct antigen properties, such as small molecules or immunodepressiva), and can be produced in a considerably simpler and more cost-efficient manner than the corresponding biomolecules.

The selection of the components for the synthesis of a TTP is mainly based the interactions between template and functional monomer. Bearing the target in mind to "fix" these interactions as efficiently as possible and in a way accessible to affinity interactions, suitable cross-linkers and solvents are additionally selected.

Each substance having a defined three-dimensional structure (shape) may be used as a template for the synthesis of TTP. Substance classes consequently extend from small molecules having molecular weights of below or about 100 Da (e.g. herbicides) up to particles such as viruses, bacteria or cells. However, compounds having a biological function such as proteins, peptides, nucleic acids or carbohydrates are of particularly great interest. The recognition of templates by TTP is based on a combination of various factors such as reversible covalent or non-covalent binding, electrostatic and hydrophobic interactions, as well as the complementarity of the structure (shape). Which one of these factors is dominant depends on the polymeric structure, the template properties, as well as the binding conditions. In hydrophobic solvents, for example, electrostatic interactions for template recognition based on TTP are frequently dominant. In polar solvents, however, hydrophobic interactions as well as specificity of structure are most important for the template recognition. TTPs should preferably be synthesized under conditions favouring the strong, yet reversible interactions between the polymer and the template. For large molecules (100 . . . 100,000 Da), however, a combination of a plurality of weaker bonds including hydrogen bonds and hydrophobic interactions can be advantageous. For smaller molecules (50 . . . 100 Da), less strong interactions such as, for example ionic bonds, are necessary for obtaining a TTP with high affinity.

Water as solvent or aqueous systems in general are, of course, of special interest in conjunction with the above-mentioned applications. Ligand/receptor systems "optimized" by nature, operate perfectly under these conditions. However, the synthesis of TTP for applications in aqueous systems, has only recently achieved an initial success (L. Andersson, *Anal. Chem.* 68 (1996) 111; S. Hjerten, J. L. Liao, K. Nakazato, Y. Wang, G. Zamaratskaia, H. X. Zhang, *Chromatographia* 44 (1997) 227). Syntheses of TTP receptors for smaller molecules cause particular problems. Up to the present moment, it is obvious that in those attempts to control not just the selection of suitable interaction agents but also the detailed arrangement of the functional groups, success has been achieved albeit only in an imperfect manner.

SUMMARY OF THE INVENTION

The invention is based on the objects to improve the known state of the art by developing template-textured materials. This task was solved in that novel template-textured polymers are synthesized, for example, on the surfaces of solid bodies as the carrier.

The present invention comprises a general polymerization method in a principally known manner, even the synthesis of TTP particles is possible under specific inventive conditions (see below). Since these particles, however, exhibit a more or less strong hydrogel character due to the preferred water-soluble monomers and the aqueous conditions (see below), the synthesis of thin TTP layers preferably is carried out on solid, preferably polymeric carriers. This surface-modification leads to covalently fixed thin layers having template imprints on its entire carrier surface, e.g. a membrane (TTM (TGM)), by means of a selectively initiated and controlled cross-linking polymerization on the carrier surface in the presence of template molecules. Due to said selectivity of the initiation, the matrix structure, respectively the pore structure, remains unobstructed. An independent optimization of the pore structure (capacity, permeability) and the surface functionality (specificity by template imprints) may therewith be achieved by means of a specific production method. Possible templates are, for example, small molecules having molecular weights of below or about 100 Da (herbicides, inter alia), larger molecules such as peptides, proteins, nucleic acids or carbohydrates, but also particles such as viruses, bacteria or cells. With filtration through or application on TTP, the templates or template-derivates may also be bound to the template imprints (functional cavities) with high specificity from diluted solutions. Thereupon, the templates or template-derivates may optionally be cleaned and subsequently either eluted under filtration conditions (as a concentrate), or may be directly identified on the carrier.

Polymeric membranes comprising a plurality of pore structures and desired mechanical etc. properties may be produced by methods such as phase inversion induced by precipitants or temperature. This allows for a selection of perfectly porous matrix membranes for the desired separation processes (E. Klein, *Affinity Membranes*, John Wiley & Sons, New York, 1991).

The choice of components for a template-specific TTP is preponderantly carried out on the basis of interactions between template (T) and functional monomer (FM). Bearing the target in mind to "fix" these interactions as efficiently as possible and in a way accessible to affinity interactions, suitable cross-linkers (C, (V)) and solvents (S, (LM)) are selected. The synthesis of the TTP layers then ensues in situ by reactive coating of the entire carrier surface, e.g. the membrane, with a reaction mixture of low viscosity, yet with maintenance of the complex consisting of T and FM. This functionalization of the membrane with TTP is carried out so as to avoid impairment of the pore structure, as well as of the stability of the matrix membrane, yet in a way that an obstruction of the (transmembrane) pores is minimized.

In order to fulfil these requirements, a photochemical initiation of a heterogenous graft copolymerization (e.g. of functional acrylates) is particularly preferred for TTP synthesis. The result is the following principal functionalization processing sequence:

1. Coating of the carrier with a photo initiator (PhI),
2. equilibration of the carrier with the reaction mixture (T, FM, C (V), S (LM), PhI), in the case of membranes: Filling and equilibrating the pore volume of the matrix membrane with the reaction mixture,
3. exposure to UV light: Selective excitation of the PhI, generation of initiator radicals on the surface of the carrier, polymerization (temperature preferably T<25° C.),
4. extraction of unconverted reactands, soluble polymer and T.

These functionalizations are based on the action of the carrier material as co-initiator, i.e. that all polymers from which radicals being able to initiate a graft copolimerization may be generated by photoinitiation, can be modified in this manner. The TTP functionalizations are possible from aqueous or organic solvents. Via the initiation and polymerization conditions, functionalization degree and, hence, surface coating of the matrix can be controlled. If necessary, an obstruction of the matrix membrane pores may also be minimized in this manner in the case of TTM Thus, the application of the method arsenal established for the TTP synthesis is possible for the surface functionalization of carrier materials.

For the photofunctionalization, a hitherto unknown interaction between the adsorption of the PhI and the T on the polymeric (membrane) surface and of the polymerization was observed. From a hydrodrophilic polymer (e.g. nylon), an adsorbed hydrophobic PhI (e.g. benzophenone) can be expelled by a hydrophilic T (e.g. terbumeton); the photo-functionalization is thereby suppressed. Such a system is not appropriate for the TTP synthesis. A hydrophilic PhI (e.g. benzophenone carbon acid), on the contrary, co-adsorbs with the hydrophilic T on the hydrophilic polymer; the photo-functionalization is thereby sufficiently efficient; T binds specifically on the so synthezised TTP. A hydrophobic PhI (e.g. benzophenone) preferably adsorbs on a hydrophobic polymer (e.g. polypropylene); the photofunctionalization is efficient; for a more hydrophilic T (e.g. terbumeton), the bonds to template imprints in the graft copolymer will dominate. Various TTP structure types can be derived therefrom (cf. FIG. 3):

a) template imprints within or/and on the surface of a cross-linked graft copolymer layer, which is fixed on the carrier surface,
b) template imprints directly on the carrier surface with participation of the matrix polymer.

A chemical grafting of polymers or cross-linked polymers (e.g. synthesis of polyaniline derivates) on the surface of a matrix membrane is suitable for the production of TTP.

Templates. Suitable substance classes extend from small molecules having molecular weights of below or about 100 Da (e.g. herbicides) up to particles such as viruses, bacteria or cells. The template concentrations in the monomer mixture for TTP production are between 0.01 and 50%. By means of the present invention, ionic and electrostatic interactions, as well as hydrogen bonds can be used even in aqueous systems for the synthesis of TTP and, hence, for molecular detection. Hydrophobic interactions can produce an additional contribution. This results in significant improvements, particularly for small molecules, and can further be used for biologically relevant molecules such as, for example, amino acids, peptides, nucleic acids, oligonucleotides, sugar and oligosaccharides, and for proteins or DNA or RNA, as well.

Functional monomers having positively or negatively charged functional groups (e.g. aminoethylacrylate derivates or acrylic acid, and methacrylic acid, respectively) are suitable for TTP synthesis. In addition, hydrophobic units such as, for example, aromatic rings, cryptands or cyclodextrines may be incorporated in TTP. Complexing-capable monomers such as metal chelate complexes, Schiffs base or specific esters can also be used for the production of TTP. Aniline and derivates therefrom with further functional groups can be used for TTP synthesis. Moreover, derivates of phenyl boronic acid, for example, which are capable of forming esters with diols, are suitable as functional monomers. The concentration of functional monomers in the mixture may be between 0 and 100%. The solvents for the polymer synthesis can be the monomer itself, water (buffer), organic solvents or mixtures thereof In general, the optimum monomer type for TTP depends on the template structure and the polymerization conditions. Dependent on the conditions and the composition of the polymerization, the textured polymers can be produced in the desired density, porosity, cross-link density and consistency. Examples for cross-linkers are ethylene glycol bismethacrylate for functional acrylates, o-phenylenediamine for polyaniline, N,N'-methylene bisacrylamide or piperazine bisacrylamide for acrylamide or bisepoxide for agarose. The cross-linker concentrations in the monomer mixture are between 0 and 80%.

In order to elute the template from the TTP, an acid which disturbs acid/base interactions, a saline solution having an ionic force sufficient for dissociation, or a solvent with a different polarity may, for example, be used. Thereby, the bonds complementary to the template structure are again released in the pores and/or on the surface of the polymer. However, applications of TTP having a bound template are also possible.

By selecting the strategy or conditions of functionalization, and apart from an optimum specificity of the template imprints, unspecific interactions of structurally similar or different substances with the TTP can equally be minimized. Examples therefor are the optimization of the functional monomer and/or of the cross-linker, additives in the reaction mixture (e.g. of hydrophilic monomers), multistage modifications or posterior derivations. The selectivity of the TTPs is therewith increased.

The structural characterization of the TTPs ensues in a principally known manner by means of established methods, e.g. scanning electron microscopy (SEM), FTIR-ATR-spectroscopy (Fourier Transform Infrared—Attenuation of Total reflexion), functional group analytics with photometric or fluorimetric methods, contact angle measurements, permeability measurements, as well as static and dynamic sorption tests with the template or other structurally similar or different substances. The static and dynamic binding capacities of the TTPs for the template, dependent on the TTP structure and the test condition (concentration, turnover time, applied substance quantities and volumes, rinsing conditions, etc.) are essential with respect to the manifold applications of the TTPs.

Templates or template derivates are bound in the template imprints with high specificity during filtration through or the application on TTP, even in high dilutions. The templates or template derivates may then, if required, be cleaned, and may subsequently be either eluted under filtration conditions (as concentrate), or may be detected directly on the carrier (cf. FIG. 4).

The following applications result from the approach according to the present invention without any limitation of the application possibilities to these specific cases:

1. Filtration (perfusion) of solutions, but also of gaseous mixtures, through TTP,
2. diffusion (dialysis) or electrodiffusion (electrodialysis) by means of TTP,
3. use of TTP in solid phase extractions, (membrane) chromatography or electrophoresis,
4. use of TTP in sensors,
5. use of TTP as catalyst,
6. application of solutions, but also of gaseous mixtures, on TTP, examples: test strips, blotting membranes, assays, drug screening.

By means of synthesized TTPs, for example, the efficient and specific reconcentration of toxic substances (herbicides) from diluted solutions is possible (cf. 1.). This can be exploited on the one hand for quantitatively eliminating such substances (detoxification); on the other hand, however, a defined enrichment (analogous to solid phase extraction; cf. 3.) for subsequent trace analysis becomes possible as well. The efficient ultra-purification of proteins, for example, a process of greatest importance in biotechnology, is likewise possible with the help of TTP (cf. 1.). Analyses, production in pure form, but also a decontamination are thereby possible as well.

The present invention allows for an improvement of the known state of the art by means of novel TTPs, which are synthesized from aqueous reaction mixtures and which also exhibit high specificities under aqueous conditions, in particular in the presence of buffer salts.

A complex between template and functional monomer, which is essentially based on ionic bonds, may easily be split by increased salt concentrations. This effect may on the one hand be used for eluting the template from the TTP, but on the other hand, restricts extremely the utilization for affinity separations, with the exception of aqueous solutions of low ionic strength.

Surprisingly, the addition of salt (e.g. buffer) during polymerization leads in this case to TTPs, having a high affinity for template molecules with a similarly high salt concentration (e.g. of the buffer under the preferred application conditions). The phenomenological aspect of this effect may be so described that the salt concentration in the reaction mixture "adjusts" the spacings of the functional groups participating in the ion exchange interaction. In the course of the synthesis, one obviously succeeds in fixing this advantageous constellation (synthetic receptor and ionic functional groups at a correct spacing). This method can be realized in a particularly efficient manner with surface functionalizations of solid carriers, which will be described in the following.

By selecting the strategy or conditions of functionalization, apart from an optimum specificity of the template imprints, unspecific interactions between structurally similar or different substances and the TTP, can be minimized. Examples therefor are the optimization of the functional monomer and/or of the cross-linker, additives in the reaction mixture (e.g. of hydrophilic monomers), multistage modifications or posterior derivatizations. The selectivity of the TTPs is therewith increased.

The novel template-textured materials according to the present invention, consist of template-textured polymers (TTPs) obtained by modifying the surface of solid carriers in aqueous or organic reaction solutions, and which by way of a cross-linking polymerization of functional monomers initiated on the surface of said solid carriers in the presence of a template leads to stable template imprints. These template imprints subsequently can bind template molecules or template derivatives in a specific manner, even from aqueous, salt-containing solutions.

The template-textured membranes (TTMs) are obtained by modifying the surface of membranes, which by way of a cross-linking polymerization of functional monomers initiated on the membrane surface in the presence of a template leads to stable receptor structures in the form of template imprints which subsequently are able to bind template molecules or template derivatives in a specific manner.

The inventive method for the production of template-textured materials consists in that the synthetization is carried out starting from a porous membrane with maintenance of the macroporous structure and the specific surface, and in that a high template-binding capacity, as well as a high permeability of the template-textured membrane are achieved. The synthesis of the template imprints ensues by means of a heterogenous, photoinitiated, cross-linking graft copolymerization of functional monomers on the carrier surface.

With the inventive production of template-textured materials, a substance of the H-abstraction type (abstraction of a hydrogen atom from the environment) is used as photoinitiator, and the carrier polymer is used as co-initiator, the initiation ensuing by photoexcitation of the photoinitiator.

The synthesis of the template imprints resides in a chemically initiated cross-linking polymerization of functional monomers on the carrier surface. A substance is used as initiator, which generates radicals or other initiator species for a polymerization due to chemical or physical excitation.

As carrier materials serve organic polymers such as, for example, polypropylene, polyethylene, polystyrene, polysulfone, polyamides, polyester, polycarbonate, polyacrylnitrile, polyvinylidene fluoride, polytetrafluoroethylene, polyacrylates, polyacrylamides, cellulose, amylose, agarose, as well as their respective derivatives, copolymers or blends of these polymers.

As carrier materials are used solid porous bodies such as glasses, silicates, ceramics or metals or composites thereof, even those comprising organic polymers.

The membranes preferably feature symmetrical or also asymmetrical porous structures and pore sizes between a few nm and 10 $\mu$m, preferably from 100 nm up to 5 $\mu$m.

As templates serve small molecules having molecular weights of below or about 100 Da, such as, for example, herbicides, active agents or amino-acids, larger molecules such as peptides, proteins, nucleic acids or carbohydrates, or even particles like viruses, bacteria or cells, and as functional monomers polymerization-capable compounds having groups enabled for interacting with templates, in particular groups comprising of carboxyl, sulfonyl, sulfate, phosphate, amino or quarternary ammonium, as well as their derivates, also in mixtures.

By a posterior or previous additional functionalization or coating, the unspecific binding of substances concurrent to template or of non-templates is decreased.

In a particular embodiment of the method according to the present invention, cross-linker monomers are also used in a mixture with the functional monomers, as well as solvents for all components of the reaction mixture.

During the production of template-textured polymers, the binding specificity and binding capacity of the template-textured polymer for the template as well as for template-similar substances may be increased by the addition of salt. As carriers films, membranes, fibres, hollow fibres, fabrics, fleece or particles are used, in each case non-porous or porous. Also a carrier-free template-textured polymer, can be produced in any optional configuration and size.

The inventive use of the novel template-textured materials resides in the separation of materials and/or the analytics of liquid or gaseous substance mixtures based on the binding of the template or template derivatives during perfusion or diffusion through template-textured polymers or the application on template-textured polymers, and further resides in the substance-specific separation of materials by means of affinity filtration through an arrangement comprising a template-textured polymer for the concentration, purification, separation or analytical determination of substances;

dialysis or electrodialysis by means of an arrangement comprising a template-textured polymer for the concentration, purification, separation or analytical determination of substances;

solid phase extraction, chromatography, membrane chromatography or electrophoresis by means of a template-textured polymer for the concentration, purification, separation or analytical determination of substances;

a template-textured polymer as sensor or catalyst for the purification, separation or analytical determination of substances, and a template-textured polymer as blotting membrane or test strip or material for assays or for drug screening.

The features of the present invention, apart from the claims, result also from the description, whereby the individual features in each case alone or in the form of combinations thereof represent advantageous protectable embodiments, for which protection is requested with the present specification. Said combination consists of known (membranes, polymers) and novel elements (modification of the entire surface of membranes by means of template-textured polymer layers, synthesis of thin TTP layers on solid carriers), which interact and result in an advantageous use and the aspired success in their novel overall effect, said success residing in that by means of the synthesized TTPs, for example the specific concentration of toxic substances from diluted solutions (constituting an enrichment for trace analytics), as well as for example the efficient ultra-purification of proteins—a process of greatest importance for biotechnology—becomes hitherto possible, and that the TTP synthesis in aqueous systems yielding a high template specificity, and the applicability of the TTP synthesis on surfaces of solid bodies as carrier can also be carried out successfully.

DETAILED DESCRIPTION OF THE INVENTION

The invention will be described in detail by means of exemplary embodiments, without being limited to these examples.

EXAMPLES

Example 1

Molecularly Imprinted Polypropylene Membrane for the Herbicide Terbumeton (2-t-butylamino-4-ethyl-6-methoxy-1,3,5-triazine)

A sample (6 cm$^2$) of a PP-MF membrane (2E HF, Akzo Nobel Wuppertal), is extracted with chloroform, dried and weighed; subsequently, in a Petri dish (d=10 cm) containing 10 ml of reaction solution consisting of 5 mM terbumeton (template), 25 mM acrylic acid (functional monomer), 600 mM ethylene glycol bismethacrylate (cross-linker) and 5 mM benzophenone (photoinitiator) in chloroform, the membrane is immersed in that solution and fixed. The Petri dish is covered with a glass plate (deep UV filter, $\lambda \geq 310$ nm). After 30 min., the exposure is carried out at half load at an UV drier (Beltron GmbH) for 9 min. in toto (9 passages through the exposure zone). Subsequently, the membrane is extracted three times with chloroform/acetic acid (98/2, v/v), and three times with chloroform.

Subsequent thereto, it is dried and the modification degree, (TTP per outer membrane surface), is gravimetrically determined: DG (degree of functionalization)=3.3 $\mu g/cm^2$. A not imprinted reference sample is prepared according to the analogous formula, however, without template. The modification degree (polymer per outer membrane surface) is: DG (degree of functionalization)=2.0 $\mu g/cm^2$.

Example 2

Molecularly Imprinted Nylon Membrane for the Herbicide Terbumeton (2-t-butylamino-4-ethyl-6-methoxy-1,3,5-triazine)

A sample (6 cm²) of a Ny-MF membrane (2D, Akzo Nobel Wuppertal), is extracted with chloroform, dried and weighed; subsequently, in a Petri dish (d=10 cm) containing 10 ml of reaction solution consisting of 1 mM terbumeton (template), 5 mM acrylic acid (functional monomer), 120 mM ethylene glycol bismethacrylate (cross-linker) and 1 mM benzophenone-4-carboxylic acid (photoinitiator) in chloroform, the membrane is immersed in that solution and fixed. The Petri dish is covered with a glass plate (deep UV filter, $\lambda \geq 310$ nm). After 30 min., the exposure is carried out at half load at an UV drier (Beltron GmbH) for 9 min. in toto (9 passages through the exposure zone). Subsequently, the membrane is extracted three times with chloroform/ethanoic (acetic) acid (98/2, v/v), and three times with chloroform. Subsequent thereto, it is dried and the modification degree, (TTP per outer membrane surface), is gravimetrically determined: DG (degree of functionalization)=24.2 $\mu g/cm^2$.

A not imprinted reference sample is prepared according to the analogous formula, however, without template. The modification degree (polymer per outer membrane surface) is:

DG (degree of functionalization)=30.0 $\mu g/cm^2$.

Table 1. shows further results for modified preparation conditions.

TABLE 1

Preparation conditions and results for polypropylene membranes (PP) and nylon membranes (PA) imprinted for the herbicide terbumeton
Initiator: 1 mM benzophenone;
* 1 mM benzophenone-4-carboxylic acid

| Membrane | Terbumeton (mM) | AA (mM) | EDMA (mM) | DG ($\mu g/cm^2$) |
|---|---|---|---|---|
| PP-MIP1 | 0.2 | 1 | 24 | 0 |
| PP-K1 | | | | 0 |
| PP-MIP2 | 1 | 5 | 120 | 2.0 |
| PP-K2 | | | | 3.3 |
| PP-MIP3 | 5 | 25 | 600 | 7.5 |
| PP-K3 | | | | 7.7 |
| PP-MIP4* | 1 | 5 | 120 | 0 |
| PP-K4* | | | | 3.3 |
| PA-MIP1 | 0.2 | 1 | 24 | 0 |
| PA-K1 | | | | 13.2 |
| PA-MIP2 | 1 | 5 | 120 | 1.7 |
| PA-K2 | | | | 17.6 |
| PA-MIP3 | 5 | 25 | 600 | 0 |
| PA-K3 | | | | 0 |
| PA-MIP4* | 1 | 5 | 120 | 24.2 |
| PA-K4* | | | | 30.8 |

MIP molecularly imprinted membrane
K not imprinted membrane (reference test)
AA acrylic acid
EDMA ethylene glycol bismethacrylate
DG degree of modification

Example 3

Application of a Molecularly Imprinted Polypropylene Membrane for Terbumeton for Concentrating Herbicides (Solid Phase Extraction)

A sample (4.9 cm²) of a membrane modified according to Example 1, is mounted in a filter holder made of steel having a Luer lock connection (Schleicher & Schuell, Dassel). 10 ml of a solution of the herbicide (terbumeton, terbutryn, desmetryn or terbutylazin) having a concentration in water in a range between $10^{-7}$ and $10^{-5}$ M are quantitatively filtered through the membrane from an injection needle at a speed of 10 ml/min. Subsequently, the filtrate and 10 ml of the raw solution respectively are extracted with 10 ml of chloroform; the herbicide concentrations are then quantitatively determined by means of gas chromatography (separating tower HP5MS; Hewlett Packard GC system HP 6890 with mass-selective detector HP 5973), and the quantity bound in the membrane is assessed.

FIG. 5 and Table 2. show representative results for PP-MIP, PP reference test and PP unmodified, as well as for $5 * 10^{-7}$ M herbicide in water.

TABLE 2

Adsorption capacity of a molecularly imprinted PP membrane
(10 ml herbicide solution; concentration $10^{-5}$M; membrane surface 5 cm$^2$)

| | Adsorption | | | | | | | |
|---|---|---|---|---|---|---|---|---|
| | terbumeton | | terbutylazin | | desmetryn | | terbutryn | |
| Membrane | % | nmol/cm$^2$ | % | nmol/cm$^2$ | % | nmol/cm$^2$ | % | nmol/cm$^2$ |
| PP | 78 | 15.6 | 95 | 19.0 | 39 | 7.8 | 98 | 19.6 |
| PP-K3 | 79 | 15.8 | 95 | 19.0 | 42 | 8.4 | 71 | 14.2 |
| PP-MIP3 | 96 | 19.2 | 76 | 15.2 | 63 | 12.6 | 100 | 20.0 |

PP unmodified membrane
PP-K3 membrane modified in the absence of template
PP-MIP3 molecularly imprinted membrane (T: Terbumeton)

Example 4

Polypropylene Membrane Imprinted for Peroxidase

On a membrane of polypropylene, aniline is polymerized to a fixedly adhering, homogenous and optically transparent film of polyanilin, PAni according to the following exemplary procedure (cf. FIGS. 1 and 2): To 30 µl of a solution of aniline hydrochloride (720 mM) and horseradish peroxidase (1.67 mg/ml) in water, 20 µl of ammonium peroxodisulfate (250 mM in water) are pipetted, thoroughly mixed, and reacted at room temperature by shaking for 2 h. Thereafter, it is throroughly washed with water and subsequently with 10 mM of sodium phosphate (pH=7.5).

Example 5

Substitution of Biological Receptors in Assays by Molecularly Imprinted Polymer Membranes Alike Example 4, membranes were modified by peroxidase TTP. The thereby obtained modified surfaces exhibit the behaviour of artificial antibodies for peroxidase. In order to demonstrate the affinity of TTP surfaces for the template peroxidase, horseradish peroxidase is adsorbed from solutions of different concentrations, and is then determined with the help of added hydrogen peroxide and VIS detection, on the basis of the sensitivity of the PAni film. The significantly higher values for the peroxidase TTP surface as compared to the very weak signal of the non-imprinted reference sample, show the stronger adhesion of horseradish peroxidase to the synthetical receptor structures under saturation of the sorption capacity in the examined concentration range.

Example 6

Molecularly Imprinted Polypropylene Membranes for the Herbicide Desmetryn (2-isopropylamino-4-methylamino-6-methylthio-1,3,4-triazine)

A round sample (46 cm$^2$) of a PP-MF membrane (nominal pore size, d=0.2 µm; 2E HF, Akzo Nobel, or d=0.6 µm; AN 06, Millipore) is extracted with chloroform and methanol, washed and weighed. Thereupon, the membrane is immersed in a 100 mM solution of BP (photoinitiator) in methanol. Subsequently, the membrane, the pores of which are still filled with BP solution, is coated with a layer in a Petri dish (d=10 cm) containing 20 ml reaction solution consisting of 10 mM desmetryn (template), 50 mM AMPS (functional monomer), 100 mM MBAA (cross-linker) and 0.1 mM BP in water. The Petri dish is covered with a glass plate (deep UV filter, λ>310 nm). After 30 min., the exposure is carried out at half load at a UV drier (Beltron GmbH) for 10 min. in toto (10 passages through the exposure zone). Subsequently, the membrane is thoroughly washed with methanol, water, 50 mM hydrochloric acid, water and methanol again. Then it is dried, and the modification degree (DG, relative to the outer membrane surface) is determined. A not imprinted reference sample is prepared according to the analogous formula, but without template. Table 3. shows the results for modified preparation conditions (pH value, salt concentration).

Example 7

Application of Desmetryn-imprinted Polypropylene Membranes for Concentrating Herbicides (Solid Phase Extraction)

A sample (4.9 cm$^2$) of a membrane functionalized according to Example 6 (cf. Table 3.) is mounted in a filter holder of steel having a Luer lock connection (Schleicher & Schuell, Dassel). 10 ml of a solution of desmetryn having a concentration in water in a range between $10^{-7}$ and $10^{-5}$ M are quantitatively filtered through the membrane from an injection needle at a speed of 10 ml/min. Subsequently, the filtrate and 10 ml of the raw solution are respectively extracted with 10 ml of chloroform; the herbicide concentrations are then quantitatively determined by means of gas chromatography (separating tower HP5MS; Hewlett Packard GC system HP 6890 with mass-selective detector HP 5973), and the quantity bound in the membrane is assessed.

Representative results are summarized in Table 4. For both matrix membrane pore sizes, the TTP membranes exhibit distinctly (TTP 1, (TGP 1)), respectively significantly (TTP 2, (TGP 2)) higher affinities for the herbicide, whereas the membranes modified by means of a chemically similar but not imprinted polymer as compared to unmodified PP, exhibit slightly increased (K1) or even lower (K2) reference values.

The TTP-bound herbicide can again be eluted from the membrane by a change of the pH value or an increased salt concentration, one example is shown in FIG. 6.

In a principally analogous manner, the herbicide could be concentrated 1000 times from a $2*10^{-9}$ M solution with a recovery of 90%; i.e. a substance-specific solid phase extraction can be used for clean-up as well as for concentration.

The TTP membranes are repeatedly usable without any loss of specificity and capacity, i.e. a decontamination application becomes therewith possible (cf. FIG. 7).

Example 8

Substance, Respectively Group Specificity of Desmetryn-imprinted Polypropylene Membranes A sample (4.9 cm$^2$) of a membrane functionalized according to Example 6 (TTP 1 (TGP 1), cf. Table 3.) is tested in the way described in Example 7: 10 ml of a solution of the respective herbicide (desmetryn, terbumeton, terbutryn or terbutylazin) having a concentration in water of $10^{-5}$ M, are quantitatively filtered through the membrane from an injection needle at a speed of 10 ml/min. Subsequently ensues the quantitative analysis such as it is described in Example 7.

Statements regarding the imprinting specificity and the group specificity of the TGP membranes can be derived from the results represented in FIG. 8.

For the template desmetryn, terbutryn and terbumeton as well (in each case methoxy-substituted, and methylthio-substituted s-triazines respectively), the affinity of TTP is higher than the one of the reference K. For terbutylazin (chlorine-substituted s-triazine) and the 1,2,4-triazine metribuzin, however, no specificity may be observed. This means that the specificity is generated by texturing; even substances having an identical hydrophilic/hdrophobic balance (terbumeton and terbutylazin, in each case 1 g $k_{ow}$= 3.04) are differently bound ("fit") by the synthetical receptor due to a different molecular detail (methoxy substituent vs. chlorine substituent). A group specificity for s-triazines having a similar substitution ("polyclonality" in analogy to antibodies) is the result.

Example 9

Affinity of Different Desmetryn-imprinted Polypropylene Membranes for Herbicides from Aqueous Buffer Solutions A sample (4.9 cm$^2$) of a membrane functionalized according to Example 6 (cf. Table 3.) is tested in the way described in Example 7: 10 ml of a solution of Desmetryn having a concentration of $10^{-5}$ M in buffer solutions having different pH values, are quantitatively filtered through the membrane from an injection needle at a speed of 10 ml/min. Subsequently ensues the quantitative analysis such as it is described in Example 7 (cf. FIG. 9).

It can be seen that with the TTP membranes polymerized from salt-free solutions (cf. Table 3.), the affinity for herbicide binding from buffer solutions is low. Even a synthesis at pH=5.5, i.e. the sodium salt of the functional monomer AMPS, produces similarly low affinities. Compared thereto, TTPs synthesized at a low pH value with the addition of salt, exhibit remarkably high affinities for herbicide bonds out of 50 mM buffer solutions. At higher pH values, the affinity of the TTPs decreases, obviously since the salt formation in all cases competes in a stronger manner with the bonds of the herbicide in the synthetic receptor.

Example 10

Substitution of Biological Receptors (in this case Anti-Atrazin-Antibodies) in Assays by TTP Surfaces Wells of 96-sized microtiter plates of polystyrene were modified under analogous conditions such as it is described in Example 6, however, with atrazin as template:

First, 250 µl of a 100 mM solution of BP (photoinitiator) in methanol are pipetted into each well, and the microtiter plate is shaken for 60 min. The solution is removed and subsequently, 250 µl of the reaction solution consisting of 10 mM Atrazin (template), 50 mM AMPS (functional monomer), 100 mM MBAA (cross-linker), and 0.1 mM BP in water are pipetted into each well. The microtiter plate is covered with a glass plate (deep UV filter, λ>310 nm). After 60 min. ensues the exposure at a UV drier (Beltron GmbH) at half load for 10 min. in toto (10 passages through the exposure zone). Subsequently, the microtiter plate is intensively washed with methanol, water, 50 mM hydrochloric acid, water and again methanol, and subsequently dried.

The so obtained modified surfaces of the wells exhibit the behavior of artificial antibodies for atrazin, a fact which may be used in a competitive triazin-assay:

In differently modified wells, 50 µl of a solution of herbicide (atrazin or metribuzin) in concentrations of $10^{-7}$ up to $10^{-4}$ M and 50 µl atrazin peroxidase conjugate solution in water (from the Pestanal Atrazin ELISA Kit; Riedel de Haen) are pipetted and incubated at room temperature for 2 hours under shaking condition. Subsequently ensue washing, development and stopping according to the protocol of the commercial assay (cf. supra).

The absorbance at 450 nm are measured in a microtiter reading device. Results are shown in FIG. 10. By means of unmodified microtiter plates, no significant absorbance modifications are obtained.

TABLE 3

Preparations of desmetryn-imprinted PP membranes (coating with BP; solutions in water; 10 min. UV-exposure at room temperature).

| | pores $d_p$ (µm) | desmetryn c (mM) | salt addition (c = 50 mM) | pH | degree of functionalization DG (µg/cm$^2$) |
|---|---|---|---|---|---|
| TTP1 | 0.2 | 10 | — | 1.5 | 863 |
| K1 | 0.2 | — | — | 1.5 | 724 |
| TTP2 | 0.6 | 10 | — | 1.5 | 178 |
| K2 | 0.6 | — | — | 1.5 | 132 |
| TTP3 | 0.2 | 10 | NaCl | 1.5 | 800 |
| K3 | 0.2 | — | NaCl | 1.5 | 430 |
| TTP4 | 0.2 | 10 | Na$_3$PO$_4$ | 2.1 | 933 |
| K4 | 0.2 | — | Na$_3$PO$_4$ | 2.1 | 343 |
| TTP5 | 0.2 | 10 | Na$_3$PO$_4$ | 5.1 | 1102 |
| K5 | 0.2 | — | Na$_3$PO$_4$ | 5.1 | 559 |

TABLE 4

Desmetryn sorption from $10^{-5}$ M solutions of the herbicide in water in Desmetryn-imprinted polypropylene membranes and reference samples (filtration rate 10 ml/min.)

| membrane | DG (µg/cm$^2$) | desmetryn sorption (%) |
|---|---|---|
| PP (0.2 µm) | — | 48 |
| TTP1 (0.2 µm) | 863 | 92 |
| K1 (0.2 µm) | 724 | 57 |
| PP (0.6 µm) | — | 12 |
| TTP2 (0.6 µm) | 178 | 16 |
| K2 (0.6 µm) | 132 | 8 |

List of Abbreviations

AA acrylic acid
AMPS 2-acyloylamino-propan-2-sulfonic acid
BP benzophenone
C(V) cross-linker
Da Dalton
DG degree of functionalization
EDMA ethylene glycol bismethacrylate
FM functional monomer
FTIR-ATR spectroscopy Fourier Transform Infrared—Attenuation of Total Reflexion spectroscopy
K reference, synthesized without template
1 g $k_{ow}$ distribution coefficient 1-octanol/water MBAA N,N'-methylene bisacrylamide
MF microfiltration
MIP molecularly imprinted polymers
PhI photoinitiator
PP polypropylene
S(LM) solvent
SEM scanning electron microscope
T template
TTMs(TGM) template-textured membranes
TTPs(TGP) template-textured polymers
UF ultrafiltration

Schematic representation of the synthesis of template-textured polymers (TTPs): Template-specific binding sites ("template imprints") are generated by cross-linking polymerization of functional monomers or cross-linking of functional polymers in the presence of a template and subsequent elution of the template.

Figure 1:
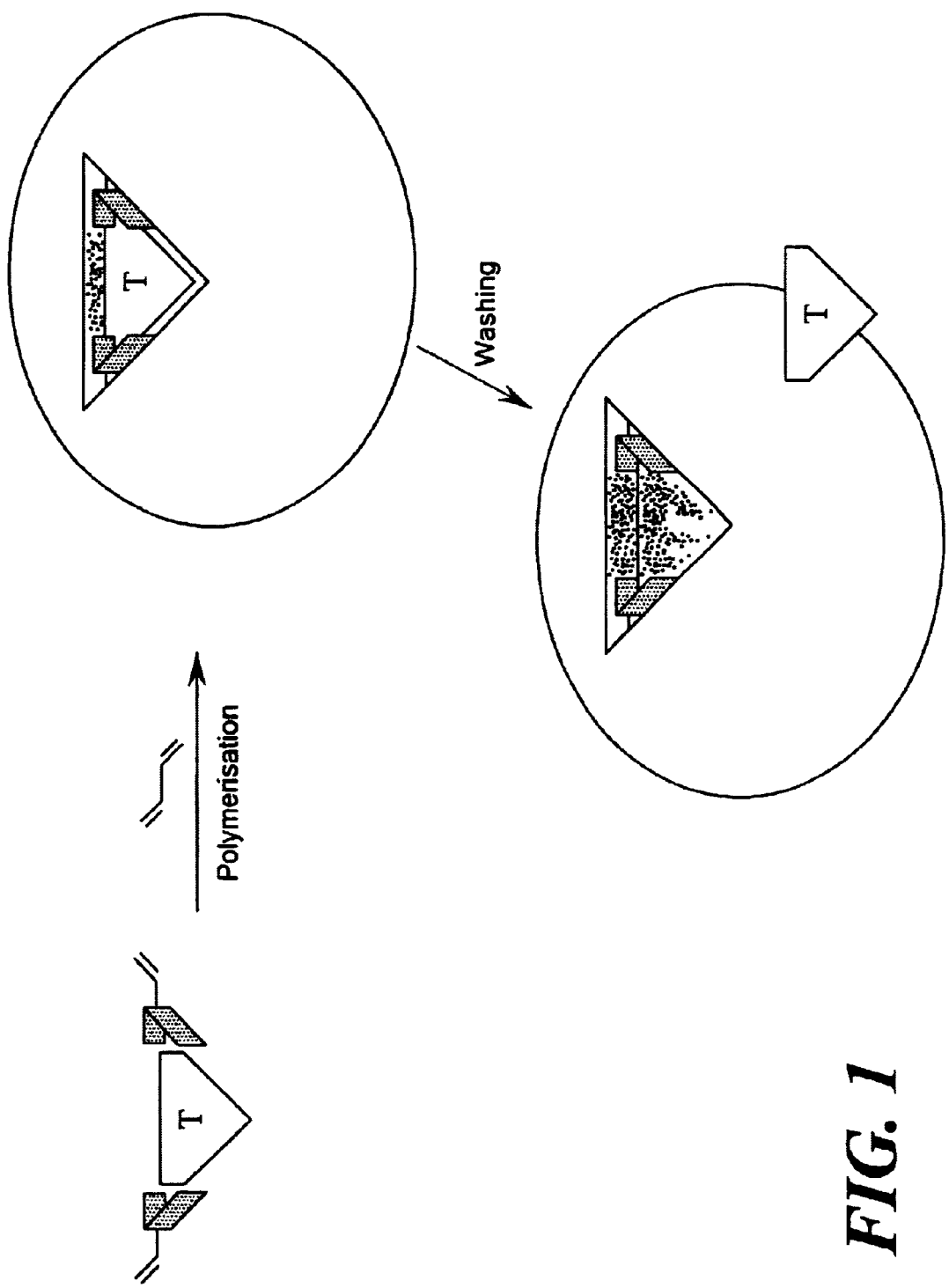
FIG. 1.
Figure 2A:
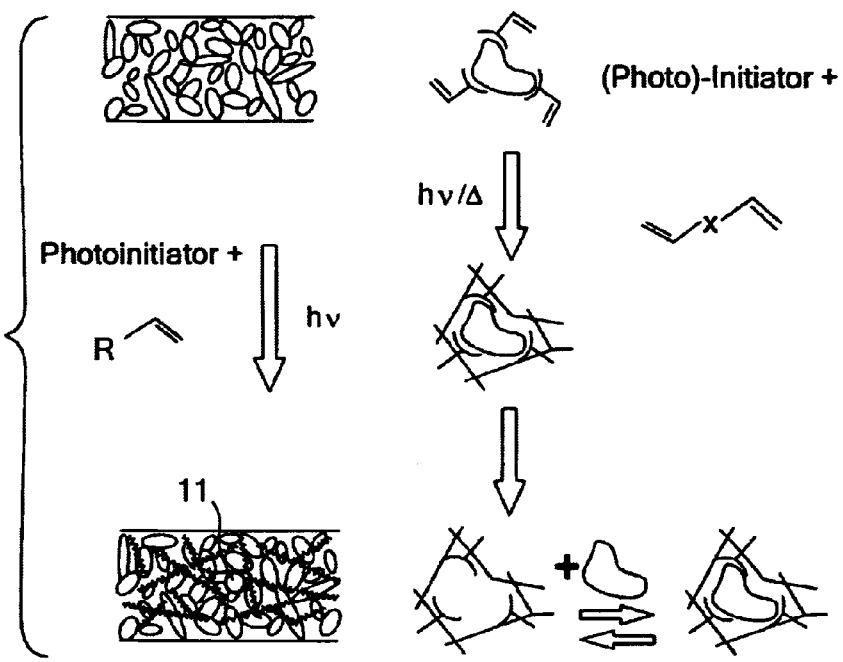
Figure 2C:
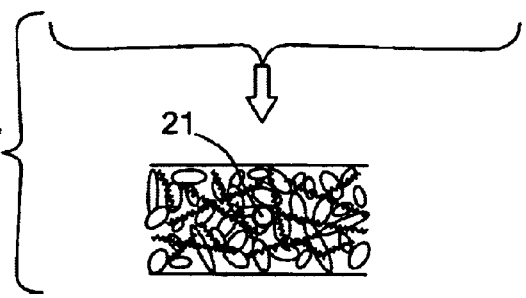
Figure 2B:
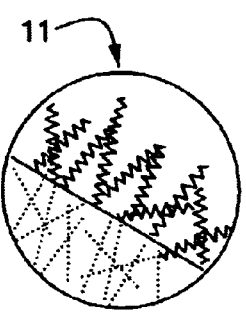
Figure 2D:
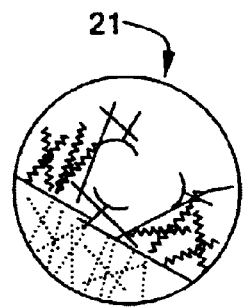
Figure 2D:
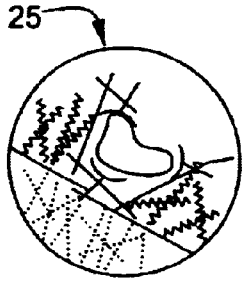

FIG. 2:

Schematic representation of the production of a template-textured membrane (TTM). On the left hand side of FIG. 2A, the principle of photo-graft polymerization is shown. Therein, a photoinitiator and a solution of a function monomer having a polymerizable group (double bond) and a functional group (R) are applied to a membrane. After UV-radiation, the monomers covalently bind to the membrane surface and form chains of graftcopolymers (see, for example, area 11 separately shown in FIG. 2B) On the right hand side of FIG. 2A, the principle of imprinting polymerization is shown. Therein, functional monomers are polymerized in the presence of a template and a cross-linker to form a template-textured polymer with template molecules bound to the imprints. After washing, the template-textured polymer is shown with free imprints. In FIG. 2C, photo-graft polymerization and imprinting polymerization are combined. In other words, a membrane covered with photoinitiator and a solution of functional monomers, cross-linker and template is irradiated. The monomer and the cross-linker form polymer with imprints (see, for example, area 21 separately shown in FIG. 2D), in which the template is reversibly bound (see area 25 in FIG. 2D).

Figure 3C:
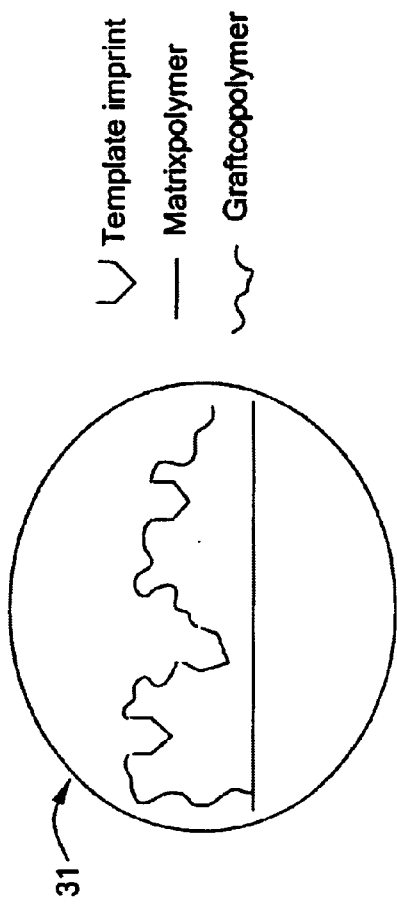
Figure 3D:
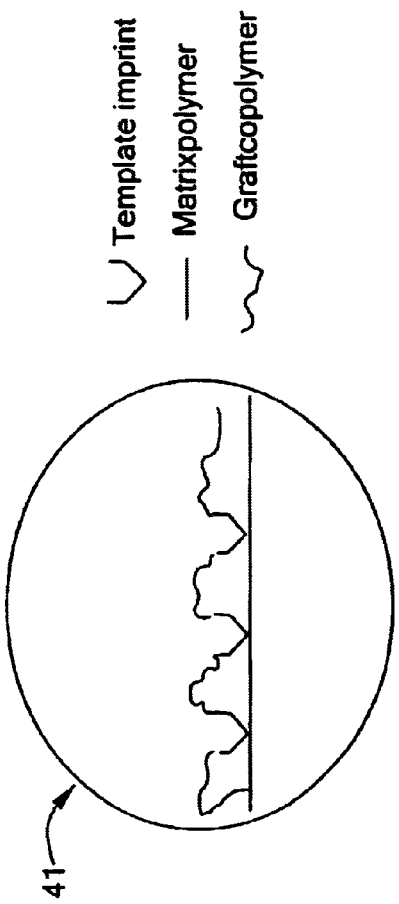
Figure 3A:
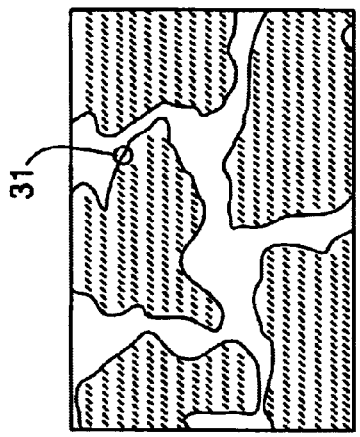
Figure 3B:
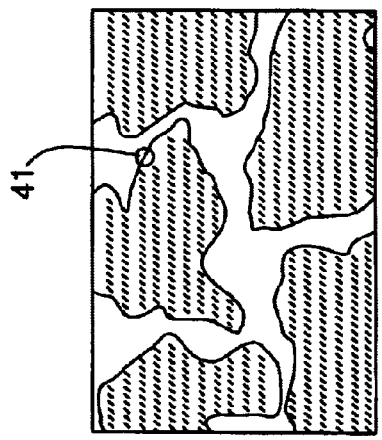

FIG. 3:

TTM (TGM) structure types:

FIG. 3A shows template imprints within and/or on the surface of a graft copolymer layer fixed to the membrane surface (area 31 of FIG. 3A being shown separately and enlarged in FIG. 3C;

FIG. 3B shows template imprints directly on the membrane surface with participation of the matrix polymer (area 41 of FIG. 3B being shown separately and enlarged in FIG. 3D).

Figure 4A:
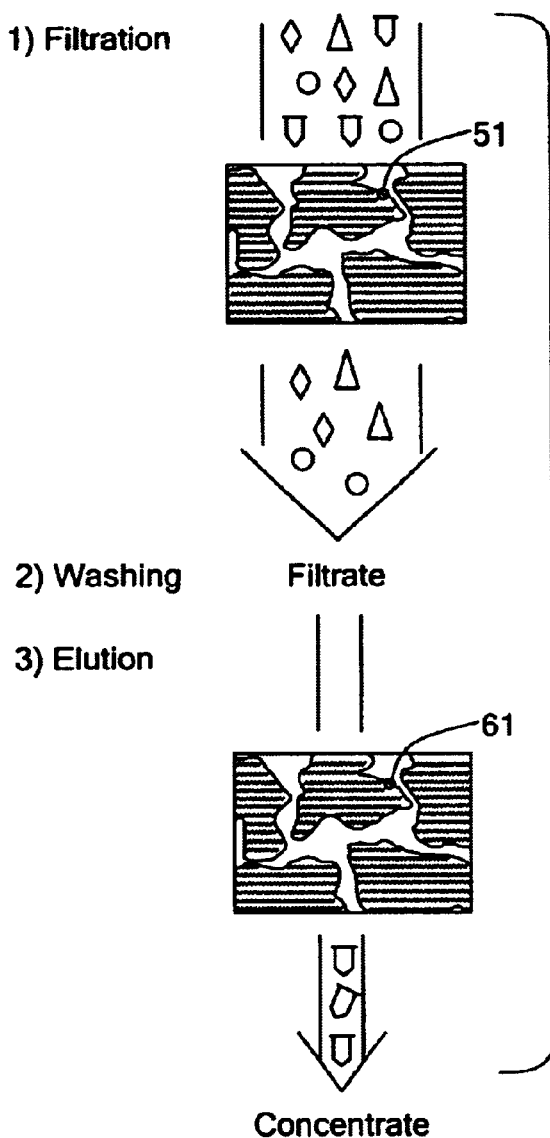
Figure 4B:
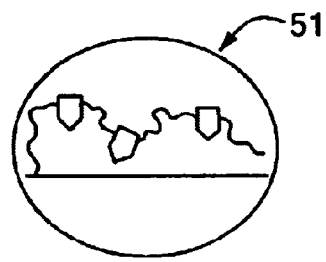
Figure 4C:
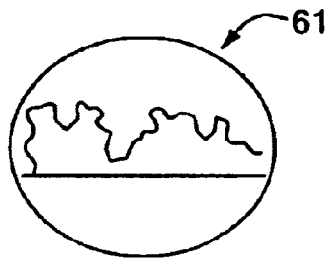
Figure 4D:
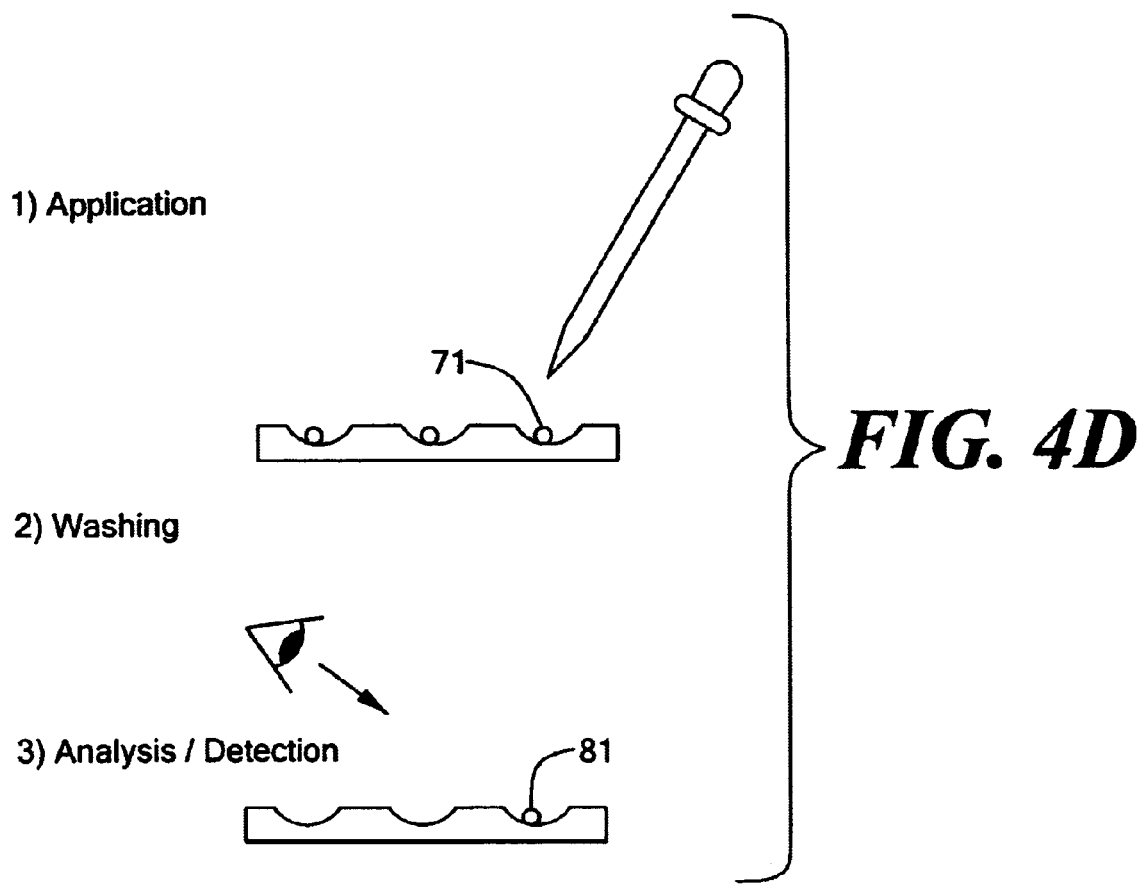
Figure 4E:
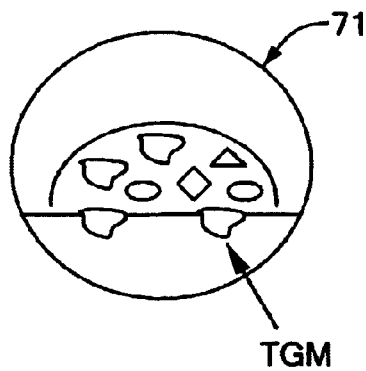
Figure 4F:
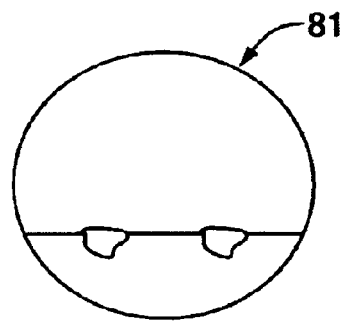
Figure 5:
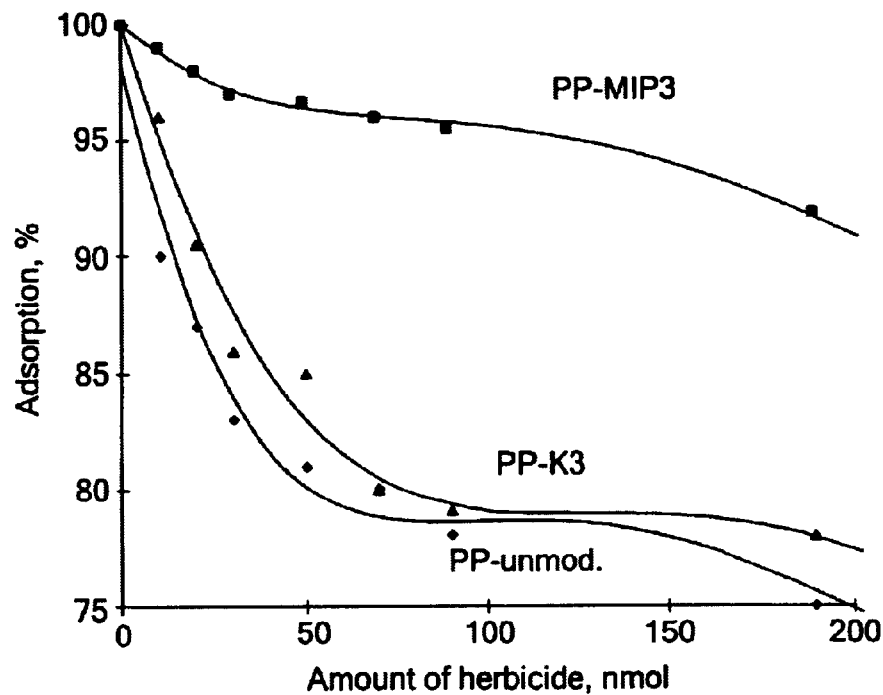
Figure 6:
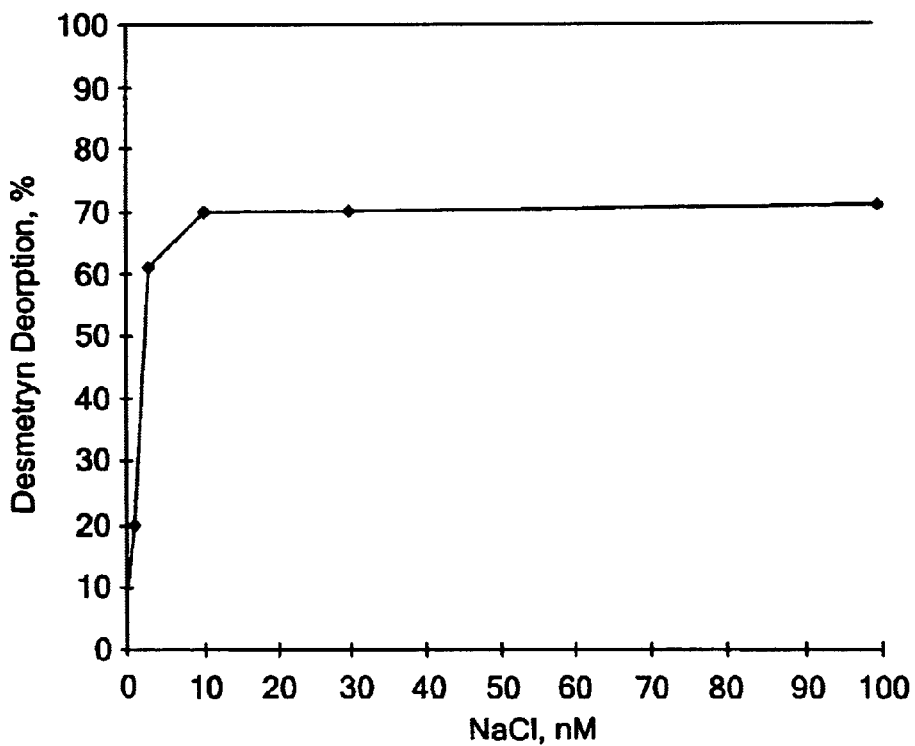
Figure 7:
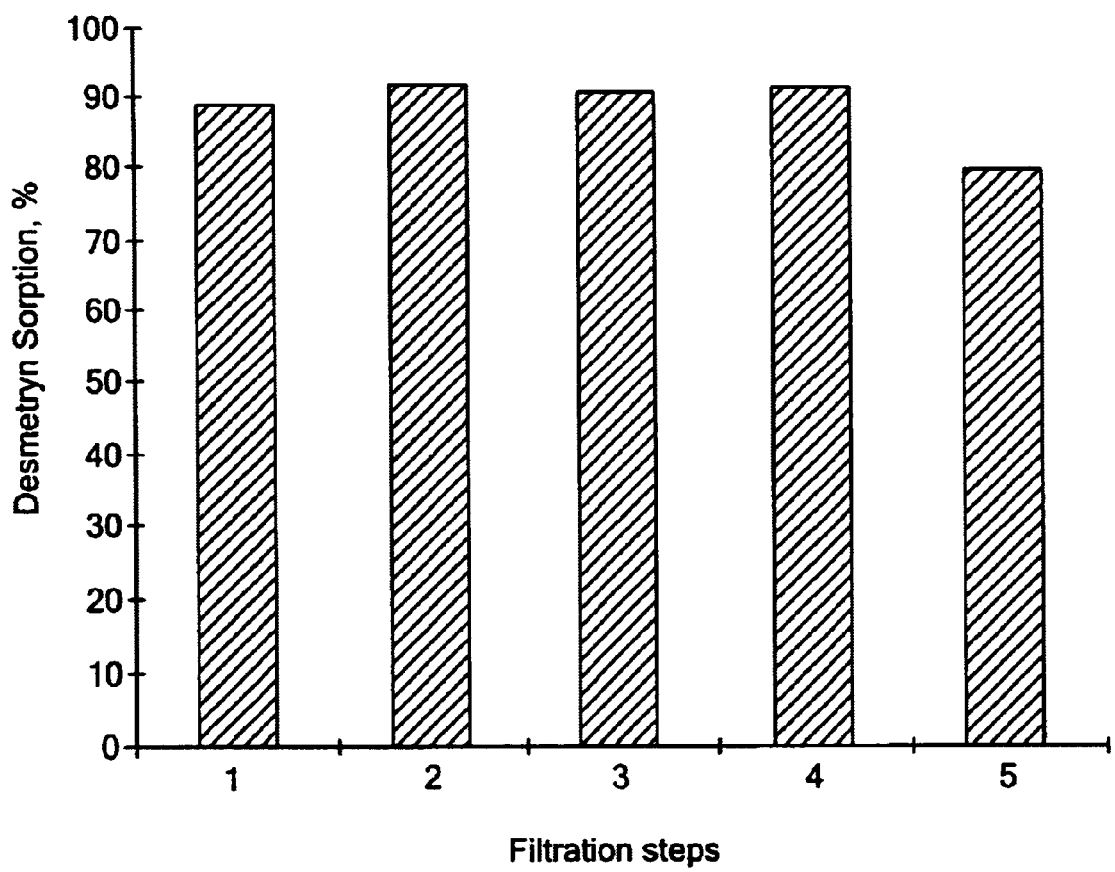
Figure 8:
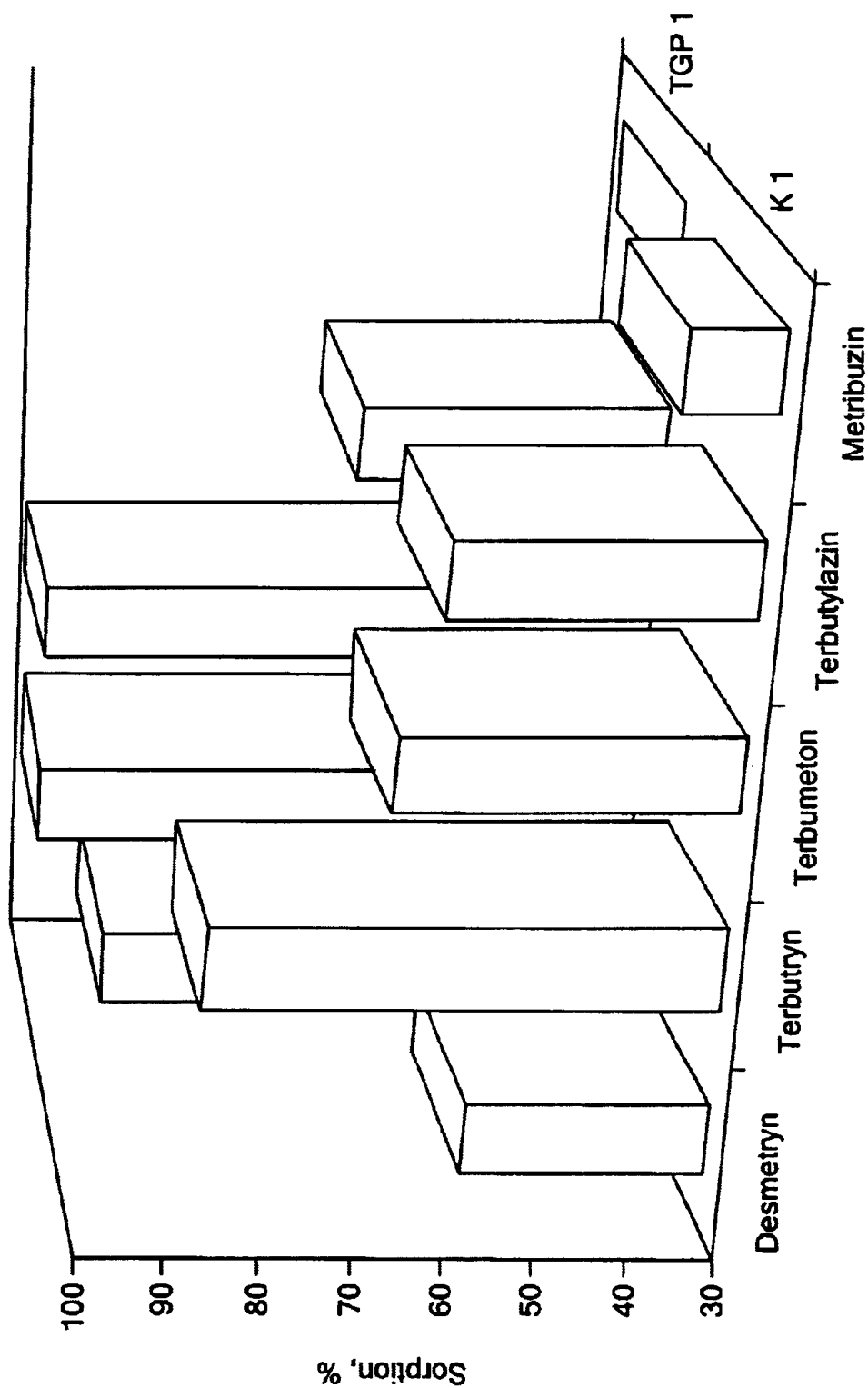
Figure 9:
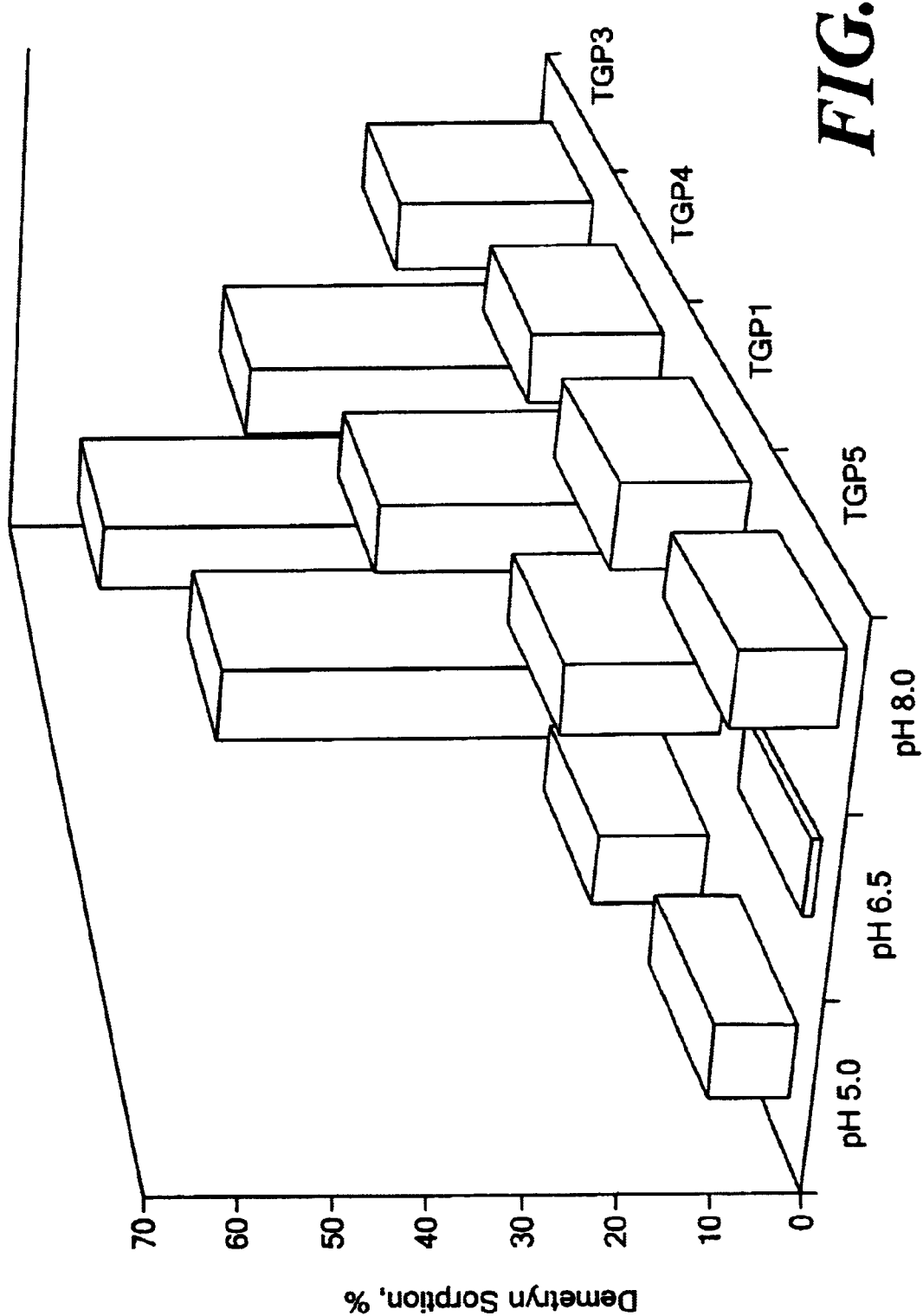
Figure 10:
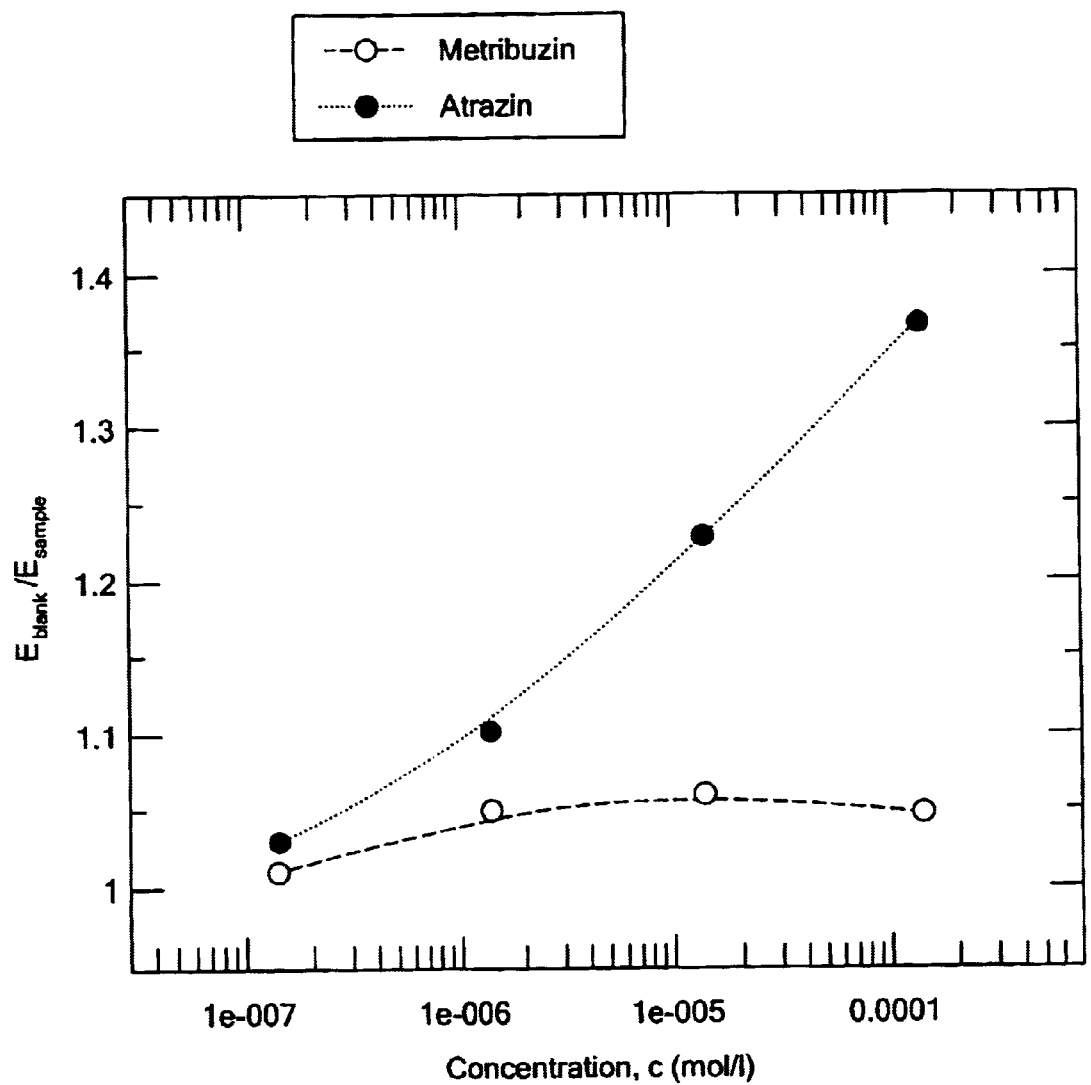

FIG. 4:

TTM applications:

FIG. 4A shows the use of a template-textured membrane to purify and to concentrate a template by way of perfusion. In step 1, a solution or gaseous mixture containing several types of substances (represented by different symbols) including the corresponding template species is filtered through the template-textured membrane whereby the template binds to the corresponding binding sites or imprints of the template-textured membrane. (Area 51 of the membrane shown in FIG. 4A is shown enlarged and in section in FIG. 4B, with template molecules bound to the template-textured membrane.) After washing in step 2, the template is eluted from the membrane in step 3 to give a concentrated template solution. (Area 61 of the membrane shown in FIG. 4A is shown enlarged and in section in FIG. 4C after elution of the template with free imprints);

FIG. 4D shows the use of a template-textured membrane fixed to the bottom of cavities of a plate for the direct analytical determination of template molecules. In step 1, a solution or mixture containing various substances including the corresponding template species is applied to the cavities and onto the template-textured membrane, whereby the template molecules bind to the corresponding binding sites or imprints of the membrane. (Area 71 of the membrane shown in FIG. 4C is shown enlarged and in section in FIG. 4E, with a drop of solution deposited onto the membrane and a pair of template molecules therein bound to the membrane). After washing in step 2, the bound template molecules are directly detected in step 3. (Area 81 of the membrane shown in FIG. 4C is shown enlarged and in section in FIG. 4F, with the two template molecules bound to the membrane.

In both cases, subsequent washing can first ensue and thereupon elution or direct analysis of the template.

FIG. 5:

Adsorption capacity of a molecularly imprinted PP membrane as a function of the applied amount of substance of a selected herbicide (terbumeton).

PP-unmod: unmodified PP membrane

PP-K3: membrane (reference sample) modified in the absence of template

PP-MIP3: molecularly imprinted PP membrane

FIG. 6:

Release of desmetryn bound in desmetryn-imprinted PP membranes (TTP 1, (TGP 1)) (after sorption from $10^{-5}$ M solutions of the herbicide in water) by filtration with/elution from/10 ml salt solution.

FIG. 7:

Repeated application of desmetryn-imprinted PP membranes (TTP 1, (TGP 1)) for the sorption of desmetryn from $10^{-5}$ M solutions of the herbicide in water (regeneration by means of washing with 50 ml hydrochloric acid and water).

FIG. 8:

Sorption of different herbicides from $10^{-5}$ M solutions in water in desmetryn-imprinted PP membranes (TTP 1 (TGP 1); filtration rate 10 ml/min.).

FIG. 9:

Influence of the pH value on the sorption of desmetryn from $10^{-5}$ M solutions in 50 mM phosphate buffer in desmetryn-imprinted PP membranes (filtration rate 10 ml/min.).

FIG. 10:

Calibration for the quantitative determination of atrazin by means of atrazin TTP functionalized microtiter plates without anti-atrazin antibodies (metribuzin as reference samples).

What is claimed is:

1. A template-textured material comprising a template-textured polymer bound directly and covalently to a surface of a solid carrier, said template-textured material being capable of specifically binding a template and being obtained by modifying the surface of the solid carrier in an organic or an aqueous or aqueous-saline solution by heterogeneous photoinitiated cross-linking graft polymerization of functional monomers on said surface in the presence of said template, said heterogeneous photoinitiated cross-linking graft polymerization using a substance of the H-abstraction feature as a photoinitiator and the solid carrier as a co-initiator.

2. The template-textured material according to claim 1, wherein the solid carrier is a membrane.

3. The template-textured material according to claim 1, characterized in that a chemically initiated cross-linking polymerization of functional monomers proceeds on the carrier surface.

4. The template-textured material according to claim 3, characterized in that a substance is used as initiator, which after a physical or chemical excitation generates radicals or other initiator species for a polymerization.

5. The template-textured material according to any of claims 1, 2, 3, or 4, characterized in that organic polymers polymerized from a member of the group consisting of polypropylene, polyethylene, polystyrene, polysulfone, polyamide, polyester, polycarbonate, polyacrylnitrile, polyvinylidene fluoride, polytetrafluoroethylene, polyacrylates, polyacrylamides, cellulose, amylose, agarose, and mixtures thereof as well as their respective derivatives, copolymers or blends of said polymers are used as carrier materials or as membrane materials.

6. The template-texture material according to any of claims 1, 2, 3, or 4, wherein the solid carriers are solid porous bodies, wherein the solid porous bodies are a member selected from the group consisting of glasses, silicates, ceramics, metals and composites thereof, and organic polymers.

7. A method for the production of template-textured materials comprising modifying a surface of a solid carrier in an organic or an aqueous or aqueous-saline solution by heterogeneous photoinitiated cross-linking graft polymerization of functional monomers on said surface in the presence of a template, said heterogeneous photoinitiated cross-linking graft polymerization using a substance of the H-abstraction feature as a photoinitiator and the solid carrier as a co-initiator.

8. The method according to claim 7, characterized in that the carrier material comprises a membrane.

9. The method according to claim 8, characterized in that a substance is used as initiator which generates radicals or other initiator species for a polymerization subsequent to a physical or chemical excitation.

10. The method according to claim 7 or 8, characterized in that the carrier materials or the membrane materials are
a) a member of the group consisting of polypropylene, polyethylene, polystyrene, polysulfone, polyamide, polyester, polycarbonate, polyacrylnitrile, polyvinylidene fluoride, polytetrafluoroethylene, polyacrylates, polyacrylamides, cellulose, amylose, agarose, and mixtures thereof as well as their respective derivatives, copolymers or blends of said polymers;
b) solid porous bodies forming a member of the group consisting of glasses, silicates, ceramics, metals and composites thereof, and organic polymers.

11. The method according to claim 7, characterized in that as carriers, films, membranes, fibres, hollow fibres, fabrics, fleeces or particles, in each case non-porous or porous, are used.

12. The method according to claim 8, characterized in that template-textured membranes are synthesized starting from a porous membrane with maintenance of the macroporous structure and the specific surface.

13. The method according to claim 8, characterized in that membranes are used having symmetrical but also asymmetrical pore structure and pore sizes between about 2 nm and 10 $\mu$m.

14. The method according to claim 7 or 8, wherein small molecules having molecular weights of below or about 100 Da and being a member selected from the group consisting of herbicides, drugs or amino-acids, wherein larger molecules and being a member selected from the group consisting of peptides, proteins, nucleic acids or carbohydrates, and wherein particles selected from the group consisting of viruses, bacteria and cells, serve as templates.

15. The method according to claim 7 or 8, characterized in that polymerizable compounds having groups enabled for interacting with templates, in particular groups comprising carboxyl, sulfonyl, sulfate, phosphate, amino or quarternary ammonium, as well as their respective derivatives, even in mixtures thereof, are used as functional monomers.

16. The method according to claim 7 or 8, characterized in that the binding specificity and binding capacity of the template-textured polymer is increased for the template as well as for template-similar substances by addition of salt.

17. The method according to claim 7 or 8, characterized in that the template is not removed from the template imprints subsequent to synthesis.

18. A method for separating a material and/or analytic of a liquid or gaseous substance mixture, said method comprising
exposing said liquid or gasous substance mixture to a template-textured material by perfusion or diffusion of the liquid or gaseous substance mixture through the template-textured material or the application of the liquid or gaseous substance mixture onto the template-textured material, said template-textured material being obtained by modifying a surface of a solid carrier in an organic or an aqueous or aqueous-saline solution by heterogeneous photoinitiated cross-linking graft polymerization of functional monomers on said surface in the presence of a template for said material and/or analytic, said heterogeneous photoinitiated cross-linking graft polymerization using a substance of the H-abstraction feature as a photoinitiator and the solid carrier as a co-initiator.

19. The method according to claim 18, wherein the template-textured material is used to separate the material and/or analytic from the liquid or gaseous substance mixture by affinity filtration.

20. The method according to claim 18 wherein the template-textured material is used to separate the material and/or analytic from the liquid or gaseous substance mixture by dialysis or electrodialysis.

21. The method according to claim 18 wherein the template-textured material is used to separate the material or analytic from the liquid or gaseous substance mixture by solid phase extraction, chromatography, membrane chromatography or electrophoresis.

\* \* \* \* \*

UNITED STATES PATENT AND TRADEMARK OFFICE
CERTIFICATE OF CORRECTION

PATENT NO.     : 6,670,427 B1
DATED          : December 30, 2003
INVENTOR(S)    : Mathias Ulbricht et al.

It is certified that error appears in the above-identified patent and that said Letters Patent is hereby corrected as shown below:

<u>Title page,</u>
Item [73], Assignee, "Poly-Am GmbH" should read -- Poly-An GmbH --.

Signed and Sealed this

Twentieth Day of April, 2004

JON W. DUDAS
*Acting Director of the United States Patent and Trademark Office*